(12) United States Patent
Brown et al.

(10) Patent No.: US 7,116,885 B2
(45) Date of Patent: Oct. 3, 2006

(54) SPOOL HAVING A UNIVERSAL FLANGE AND METHOD OF MAKING SAME

(75) Inventors: Dennis M. Brown, Elmira, NY (US); W. Jay McKendrick, Painted Post, NY (US); Satish Pattanaik, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 6 days.

(21) Appl. No.: 10/817,235

(22) Filed: Apr. 2, 2004

(65) Prior Publication Data

US 2004/0218887 A1    Nov. 4, 2004

Related U.S. Application Data

(60) Provisional application No. 60/466,669, filed on Apr. 30, 2003.

(51) Int. Cl.
*G02B 6/00*    (2006.01)

(52) U.S. Cl. ........................................ 385/137; 385/135

(58) Field of Classification Search ......... 385/134–137
See application file for complete search history.

(56) References Cited

U.S. PATENT DOCUMENTS

| | | | | |
|---|---|---|---|---|
| 5,802,237 | A  * | 9/1998 | Pulido | 385/135 |
| 6,424,784 | B1 * | 7/2002 | Olson | 385/135 |
| 6,456,773 | B1 | 9/2002 | Keys | 385/135 |
| 6,522,826 | B1 * | 2/2003 | Gregory | 385/135 |
| 6,533,205 | B1 * | 3/2003 | Kles | 242/362 |
| 6,643,444 | B1 * | 11/2003 | Putnam | 385/135 |
| 6,895,150 | B1 * | 5/2005 | Stingl | 385/110 |
| 2002/0118944 | A1* | 8/2002 | Burns et al. | 385/135 |
| 2002/0146228 | A1 | 10/2002 | Afflerbaugh et al. | 385/135 |
| 2002/0191937 | A1 | 12/2002 | Knox et al. | 385/135 |
| 2004/0218886 | A1* | 11/2004 | Brown et al. | 385/135 |

* cited by examiner

*Primary Examiner*—Sung Pak
*Assistant Examiner*—Tina M. Wong
(74) *Attorney, Agent, or Firm*—Suetlana Z. Short

(57) ABSTRACT

A spool comprises: a hub sandwiched between two flanges. At least one of the flanges includes at least one smoothly curving arcuate fiber groove on a side facing the hub. The fiber groove extends substantially to the outer edge of said flange. The groove is situated at a shallow angle $\theta$ relative to the tangent line to the periphery of the flange, the angle $\theta$ being no more than 15 degrees.

10 Claims, 6 Drawing Sheets

SPOOL HAVING A UNIVERSAL FLANGE AND METHOD OF MAKING SAME

CROSS-REFERENCE TO RELATED APPLICATIONS

This application claims the benefit of U.S. Provisional Application Ser. No. 60/466,669, filed Apr. 30, 2003, entitled "A Spool Having a Universal Flange and Method of Making Same."

BACKGROUND OF THE INVENTION

1. Field of the Invention

The present invention relates generally to spools for holding optical fiber, and particularly to spools for holding dispersion compensating fiber.

2. Technical Background

Optical signals transmitted in an optical fiber transmission system typically constitute a series of pulses. Although, within each channel, the pulses are usually centered at a single nominal wavelength, each pulse is actually composed of different spectral components. These spectral components propagate through transmission or typical amplification fibers at different speeds (due to a phenomena referred to as chromatic dispersion). This can result in spectral components of one pulse arriving at a receiver at the same time as the succeeding pulse, thereby degrading the signal to noise ratio. Thus, optical fiber communication systems utilize dispersion compensating modules ("DCM"), to correct for chromatic dispersion. A typical dispersion compensating module includes a housing with one or more spools 10 of dispersion compensating fiber (DCF). This dispersion compensating fiber offsets the chromatic dispersion produced in the transmission and/or amplification fiber. This approach is disclosed, for example, in U.S. Pat. No. 6,456,773 and is illustrated in FIG. 1.

A typical spool 10 of DCF is shown in FIG. 2 and includes a cylindrical hub 12, two flanges 14, 14', a cover plate 16 and a protective casing 18. The casing 18 covers the fiber and is situated between the flanges. The DCF is wound around the hub 12 between the two flanges 14, 14' and is protected by the casing 18. The dispersion compensating fiber typically enters into the spool via the underlay groove 15 provided on the internal surface of one of the flanges and exits the spool via the fiber exit or fiber reverse groove 20, provided on the external surface of one of the flanges. The underlay groove 15 is utilized to get the DCF to the hub 12, so as to enable the startup of the winding process. The underlay groove 15 is tangential to the outer diameter of the flange in order to minimize fiber bending. However, this ties the geometry of the underlay groove to the required form factor (i.e., overall size and shape of the package).

After winding is completed, the dispersion compensating fiber exits the spool 10 via the fiber groove 20. In order to protect this fiber a cover plate 16 is then fitted over the external surface (the surface not in contact with the hub 12) of the flange 14' (and the dispersion compensating fiber contained within the fiber groove 20). In order to minimize fiber bending, and in order to maximize mechanical reliability and life span of DCF, the fiber groove 20 is positioned to allow the DCF to exit substantially tangentially to the radius of the flange. In non-round packages, a mandrel in the box typically reverses the direction of the exiting fiber to align it with fiber entry orientation. In a round package this is done by the reversing fiber groove 20, so that both entering fiber and exiting fiber points in the same direction.

The dispersion fiber containing spools have to be custom made for each customer because each customer requires a different size spool. For example, because the fiber underlay and fiber grooves terminate tangentially to the radius of the flange, the flanges can not be cut down to a smaller size. Thus, features of the plain flange 14, the grooved flange 14' and the casing 18 are dependent on the required form factor.

The hubs of the spools are typically molded for different thicknesses. The molded parts are then machined to different sizes to maximize the fiber holding capacity for a given form factor. Because the form factor is customer dependent, a standard size hub can not be used. This further increases the cost of the DCM spools.

In addition, if the thermally induced expansion of the hub exceeds a certain value, the DCM turns dark (i.e., stops functioning). Thus, because wound DCF is sensitive to temperature induced stress and has a low coefficient of thermal expansion (CTE), the hubs are usually made from materials with low CTE, for example Macor™, Invar™, or Covar™. During temperature fluctuations, this allows the wound DCF to expand at about the same rate as the hub, minimizing fiber stretching. Macor™ is a glass ceramic with CTE which is similar to that of the DCF. However, it is a very expensive material. Invar™ and Covar™ have a higher CTE than Macor, and are also very expensive.

SUMMARY OF THE INVENTION

One aspect of the invention is a spool comprising: a hub sandwiched between two flanges at least one of said flanges including at least one smoothly curving arcuate fiber groove on a side facing said hub, said fiber groove extending substantially to the outer edge of said flange, said groove being at an angle θ relative to the tangent line to the periphery of said flange.

According to another aspect of the invention a method of making a spool comprises the steps of:

(i) providing at least two flange performs;

(ii) trimming the performs to a desired size, thereby producing a flanges of desired diameter;

(iii) providing a hub;

(iv) assembling the hub and the flanges into the spool.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
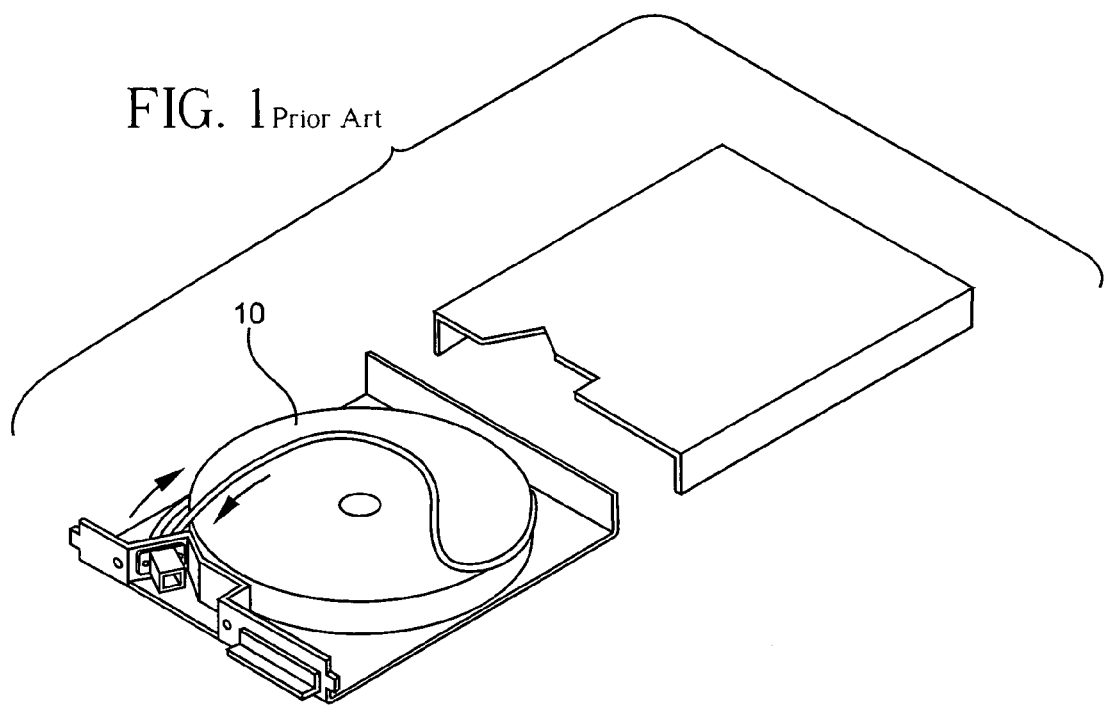
FIG. 1 illustrates a Prior Art spool suitable for holding a DCF.
Figure 2:
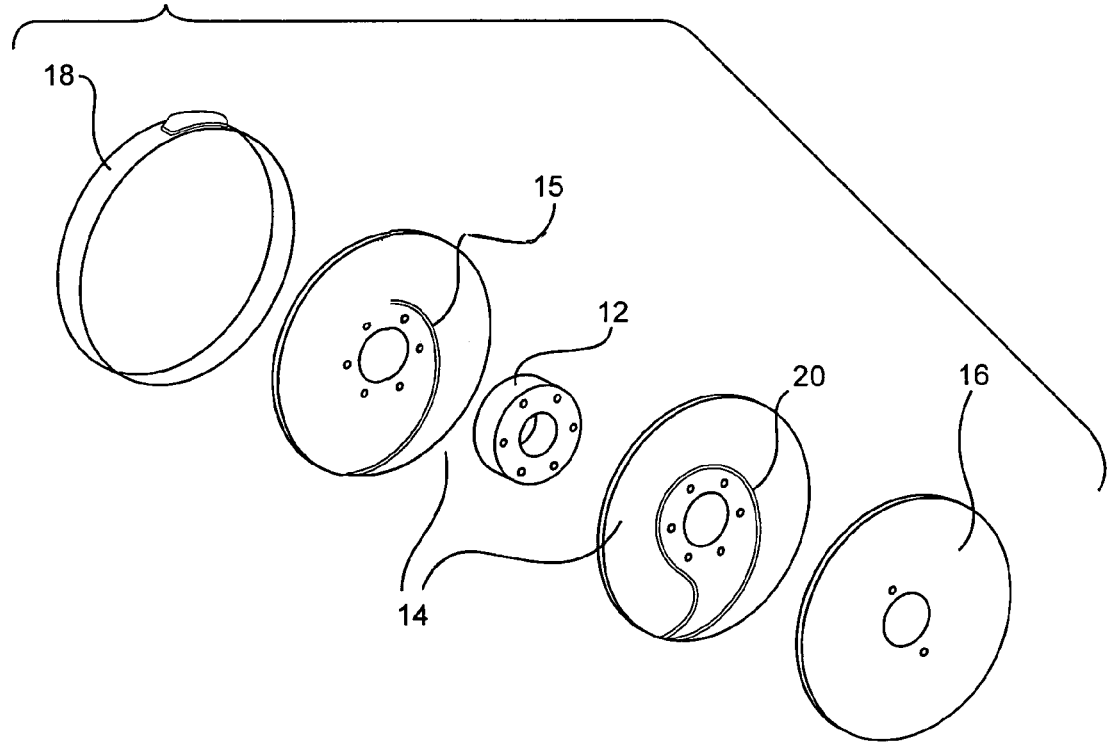
FIG. 2 illustrates a construction of a spool of DCF according to Prior Art.

Reference will now be made in detail to the present preferred embodiments of the invention, examples of which are illustrated in the accompanying drawings. Whenever possible, the same reference numerals will be used throughout the drawings to refer to the same or like parts. One exemplary embodiment of the DCF spool of the present invention is shown in FIG. 3, and is designated generally throughout by the reference numeral 100.

Figure 3:
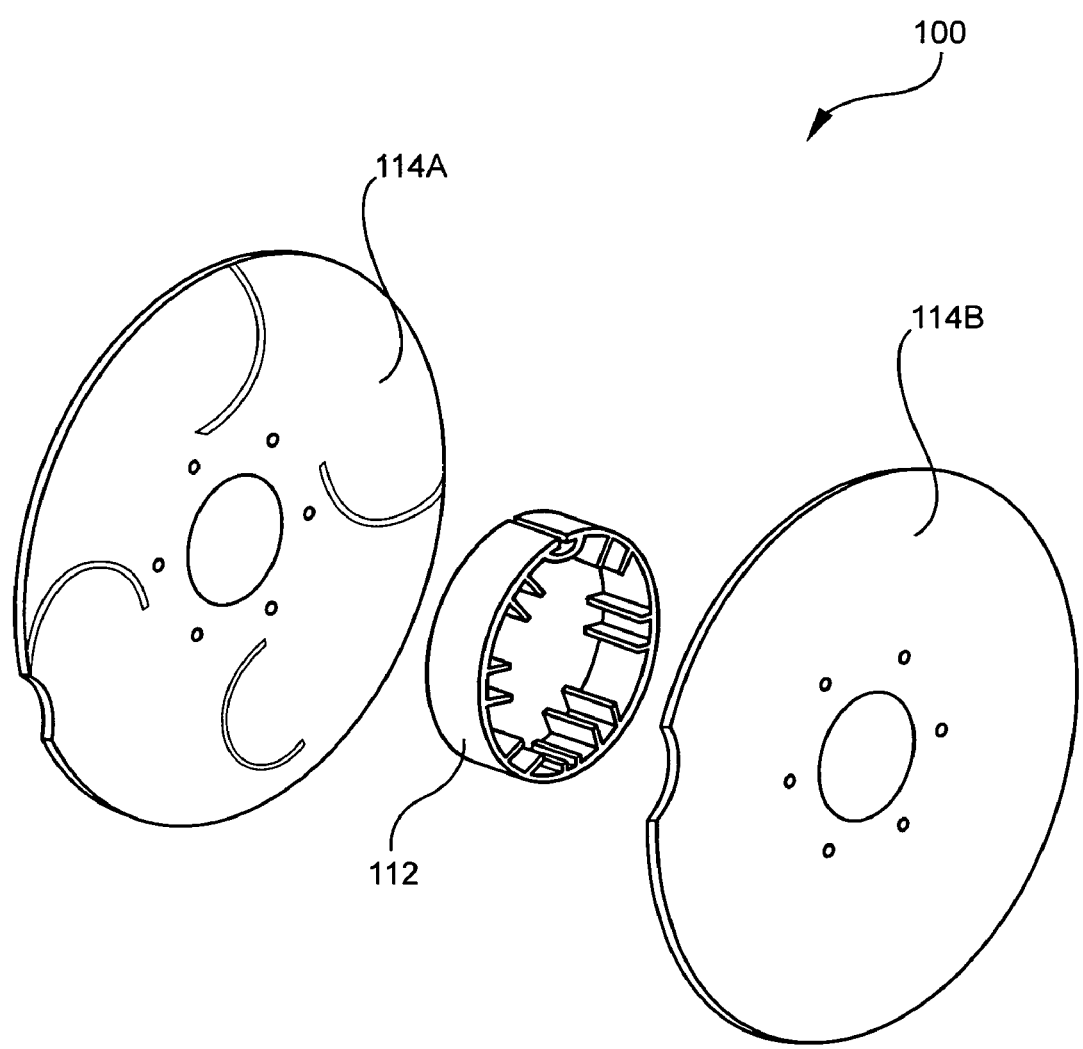
FIG. 3 is a exploded view of a DCM according to of one embodiment of the present invention.

As embodied herein and depicted in FIG. 3 the spool 100 includes a hub 112 and two flanges 114A, 114B and, does not require a cover plate. Preferably, the hub 112 is made from a relatively inexpensive material, such as aluminum or inexpensive plastics, for example Propylux™ FR, available from Westlake Plastics, Lenni, Pa. The hub 112 is constructed in a manner that would substantially (less than 0.1%) preserve hub's outer diameter $D_H$ during temperature fluctuations, thus minimizing $D_H$ changes. It is preferred that the hub's outer diameter $D_H$ changes by less than preferably 0.05% and most preferably by less than 0.035% of its diameter during the temperature variations between −40° C. to 85° C. The hub 112 is designed to transform what would otherwise be radial expansion induced by the change in temperature (from −40° C. to 85° C.) into tangential displacement. This allows one to eliminate the use of very expensive materials with a very low coefficient of thermal expansion for manufacturing the hub. Two exemplary designs of hubs of the present invention are illustrated in FIGS. 4 and 5.

Figure 4:
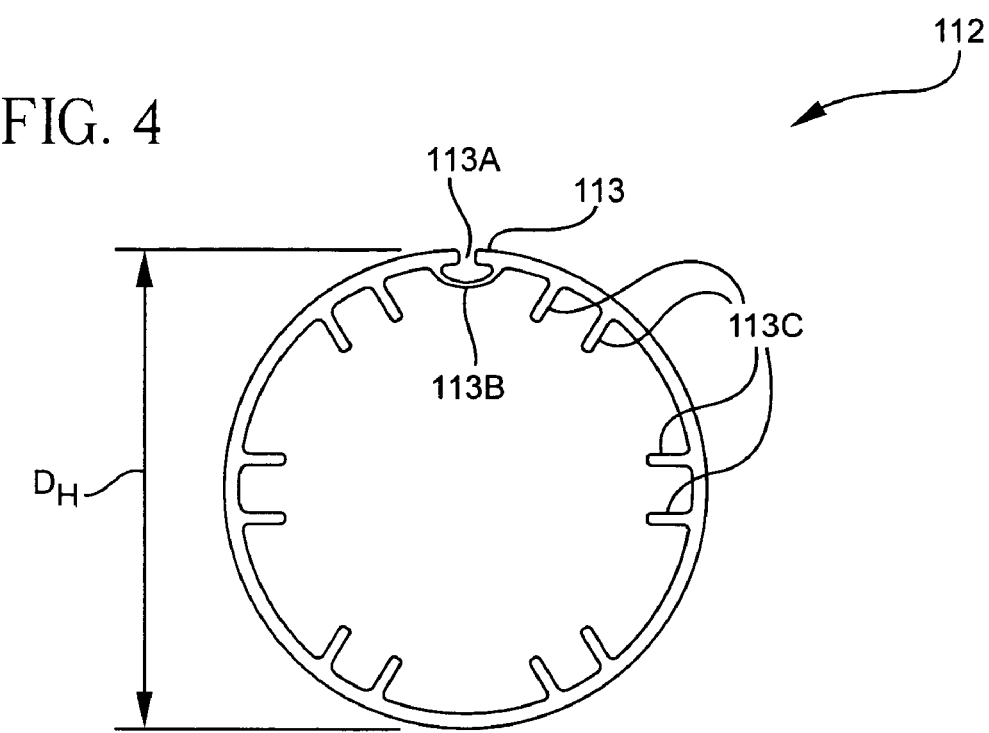
FIG. 4 illustrates a first embodiment of an exemplary hub utilized in a DCM.

More specifically, FIG. 4 illustrates a cross sectional view of the first exemplary hub embodiment. The hub 112 of this embodiment includes at least one "living" hinge 113 forming a cavity in the periphery of the hub. The hinge 113 includes a narrow gap or an opening 113A in the outer (cylindrical surface) of the hub 112 and a bridge 113B. When the temperature increases, the outer surface circumference of the hub 112 increases, without increasing the outer diameter $D_H$ of the fiber barring surface, thereby closing or reducing the size of the gap 113A. When the temperature decreases, the outer surface circumference of the hub 112 decreases, without decreasing the outer diameter $D_H$ of the fiber barring surface (the outer diameter of the hub 112), thereby enlarging the gap 113A. The hub 112 also includes optional structural ribs 113C. These ribs add strength to the hub 112 and provides support for the rivets for attachment to the flanges 114A and 114B. If the hub is made of metal, for example, aluminum, the ribs may not be needed.

Figure 5:
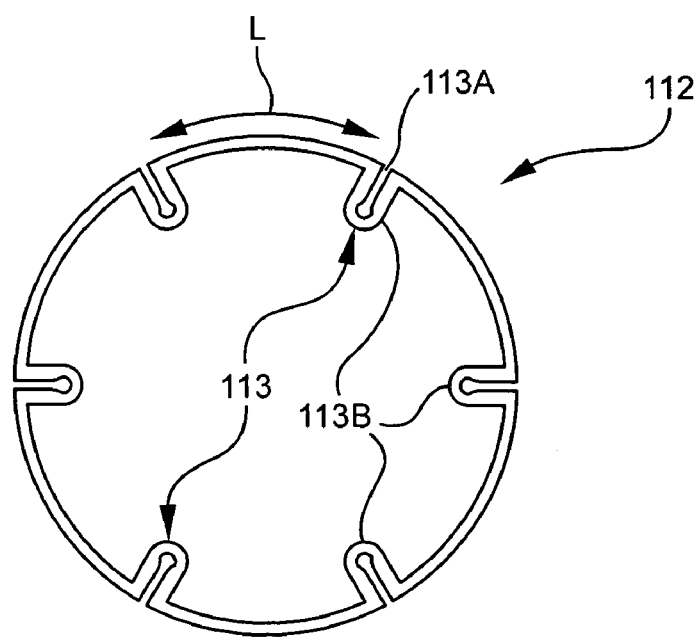
FIG. 5 illustrates a second first embodiment of an exemplary hub utilized in the DCM.

FIG. 5 illustrates a cross sectional view of the second exemplary hub embodiment. The hub 112 of this embodiment includes at a plurality of "living" hinges 113. In this design, in order to maintain outer diameter of the fiber bearing surface of the hub, utilizes openings 113A in the circumference and surface folds 113B. When the temperature increases, the length L of the fiber bearing sections located between the openings 113A increases, narrowing these openings, without increasing the outer diameter of the fiber bearing surface. In addition, the fold surfaces 113B provide structural strength to the hub 112 and can be used to hold the rivets that attach the hub 112 to the flanges 114A, 114B.

Figure 6:
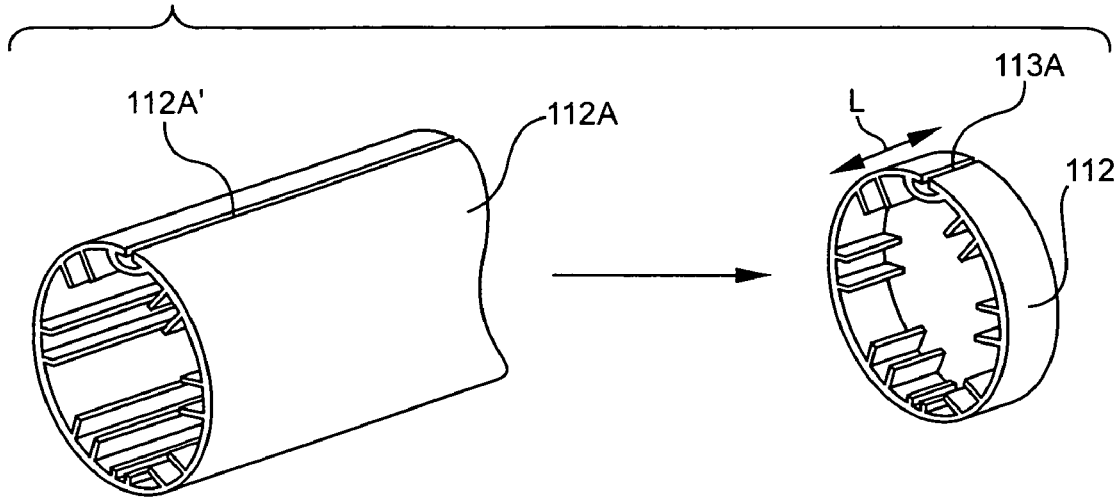
FIG. 6 illustrates an embodiment of an extruded hub pipe that is cut to a required size to provide a hub of length 1.

In order to minimize manufacturing costs, it is preferable that the hub 112 be made with material that has a relatively large CTE, for example 14 μin/in ° C. or higher, and more preferably 20 μin/in C.° or higher, at the temperature range of −40° C. to 85° C. It is preferable that the hub be made from an inexpensive plastic suitable for extrusion. As illustrated in FIG. 6, an extruded hub pipe 112A can be cut, as needed, to a size specified by the end user, further minimizing manufacturing costs. Examples of some of the suitable materials are provided in Table1, below.

TABLE 1

| Material | CTE (μm/in C) | Modulus (ksi) | CTE*Modulus | Relative Cost |
|---|---|---|---|---|
| Ultem ® 2300 | 11 | 900 × 10E3 | 9.9 × 10E6 | $$$$ |
| Hydex ™ 6120 | 14 | 900 × 10E6 | 12.6 × 10E6 | $$$ |
| Zelux ™ M | 38 | 340 × 10E3 | 12.9 × 10E6 | $$ |
| Lexan ® 943 | 38 | 325 × 10E3 | 12.3 × 10E6 | $$ |
| Cycoloy ® C2950 | 40 | 385 × 10E3 | 15.4 × 10E6 | $$ |
| Propylux ™ FR | 21 | 220 × 10E3 | 4.6 × 10E6 | $ |

The materials Ultem®, Lexan® and Cycoloy® are commercially available from GE Plastics, of Schenectady, N.Y. The materials Zelux™ and Propylux™ are commercially available from West Lake Plastics of Lenni, N.Y. Hydex™ is are commercially available from A. L. Hyde Company of Grenloch, N.J.

In accordance with one embodiment of the invention, a method of making a spool 100 for DCF includes the following steps: extruding a plastic hub pipe 112A having at least one living hinge 112A'; cutting off a required length l of this hub pipe 112A, thereby producing a plastic hub 112 of length l, the hub 112 having at least one living hinge 113; providing two flanges 114A, 114B; assembling the plastic hub 112 and the flanges 114A, 114B into a spool 100. As stated above, in order to minimize manufacturing costs, it is preferable that less expensive plastics be used. These plastics have CTE 14 μin/in C.° higher, and more preferably 20 μin/in C.° or higher, at the temperature range of −40° C. to 85° C.

In accordance with another embodiment of the invention, a method of making a spool 100 for DCF includes the following steps: producing a metal hub pipe 112A, cutting a required length of this hub pipe 112A, thereby producing a hub 112; providing two flanges 114A, 114B; assembling the hub 112 and said flanges 114A, 114B into a spool 110. An aluminum hub pipe may be produced, for example, by extrusion.

Thus, according to an embodiment of the present invention a spool comprises a hub 112 sandwiched between two flanges 114A, 114B. The hub contains at least one living hinge forming a cavity in a periphery of said hub, such that during the temperature variations between −40° C. to 85° C.: (i) the outer surface circumference of the hub changes, thereby changing the size of the opening associated with the cavity; and (ii) the outer surface diameter $D_H$ of said hub remains substantially constant.

The flanges 114, 114B can be made from either metal, for example aluminum or steel, or plastic. Preferably, the features of the flanges 114A, 114B are independent of the flange diameter, allowing for less expensive manufacturing. The flanges 114A, 114B are preferably made by first stamping out a universal flange preform 114 (shown in FIG. 7) and then trimming the stamped flange preform 114 to an outer diameter $D_F$ on as needed basis. By this method, identical flange preforms will be used to prepare different diameter flanges for different consumers. According to one embodiment of the present invention a spool comprises: a hub 112 sandwiched between two flanges 114A, 114B. At least one of these flanges includes at least one smoothly curving fiber groove 120A on a side facing the hub. The fiber groove is formed on a surface of the flange and does not extend all the way through the thickness of the flange. The fiber groove 120A extends substantially (0.0 to 3 mm and preferably 0.0 to 2.5 mm) to the outer edge of the flange. The fiber groove is arcuate (forms an arc) and forms an angle $\theta$ relative to the tangential line to a periphery of the flange. It is preferable that the angle $\theta$ be no more than 15 degrees. It is more preferable that $\theta$ is less than 10 degrees, even more preferable that $\theta$ is less than 5 degrees, and most preferable that $\theta$ is less than 3 degrees. It is preferred that the minimum arc radius of the fiber groove is greater than 20 mm and preferably greater than 25 mm. The fiber groove is v-shaped and is between 0.030" and 0.045" deep and the size of the groove opening w is 0.06" to 0.15" and preferably between 0.6" and 0.12". It is most preferable for the groove width to be between 0.7" and 0.1". In this embodiment the groove width is 0.9".

Figure 7:
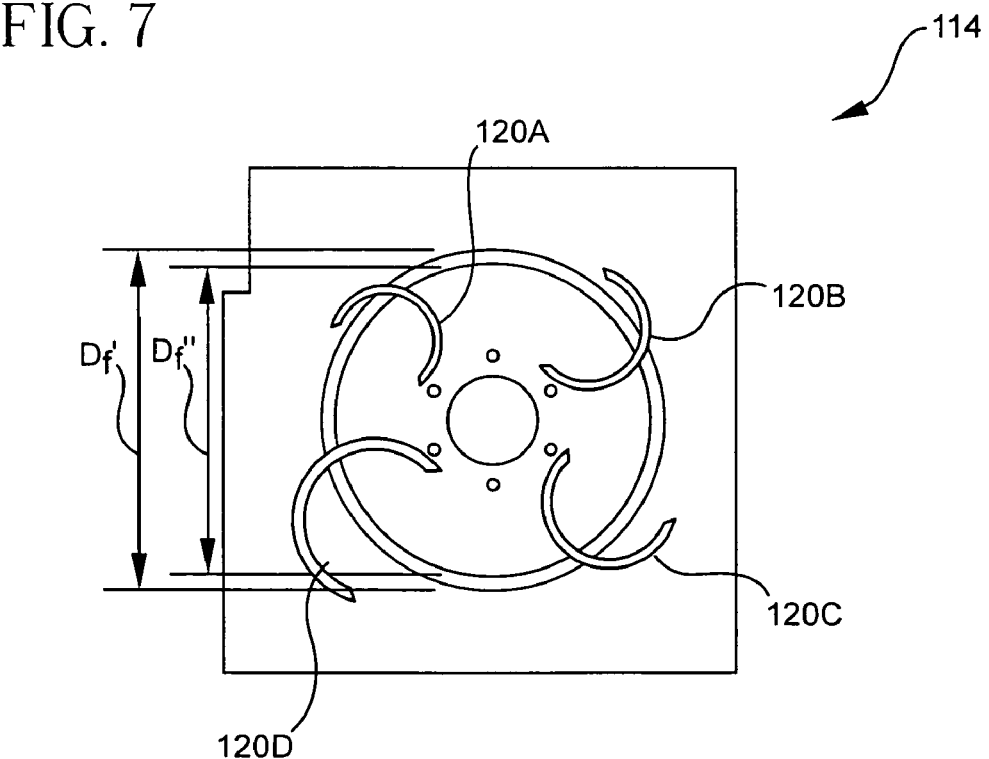
FIG. 7 illustrates a first embodiment of a stamped universal flange perform.

More specifically, FIG. 7 illustrates that the flange preform 114 includes a plurality of fiber grooves 120A, 120B, 120C, and 120D. Flange preform 114 may have a larger or a smaller number of the fiber grooves. Each of these fiber grooves 120A, 120B, 120C, 120D corresponds to a flange with a different range of diameters $D_F$. The fiber grooves 120A, 120B, 120C, 120D are curved such that when flanges are cut to a flange of the desired diameter $D_F$, the shape at least one of the fiber grooves would allow (i) the fiber to exit the flange at a shallow angle, preferably parallel to the circumference of the flange 114A, 114B and, (ii) the fiber bend radius to be larger than the minimal acceptable bend radius (i.e., at least 20 mm). In this embodiment the fiber grooves 120A, 120B, 120C, 120D are semicircular, but they may be of another, arcuate, smoothly curving shape. The fiber grooves 120A, 120B, 120C, 120D are formed on the surface of the flange and do not extend all the way through the thickness of the flange. The fiber grooves 120A, 120B, 120C, 120D allow the exiting fiber to point in the same direction as the in-coming fiber, so that two fiber ends are spliced to pigtails that are roughly parallel to one another. This feature is advantageous because in packages with circular footprint both the pigtails are managed by the same routing approach. In noncircular packages this feature also eliminates the use of a turn-around mandrel. However, the fiber grooves can be modified to provide an option of fiber exiting in a direction opposite of direction of entry. The exiting fiber can be spliced to pigtails by means known in the art.

Figure 8:
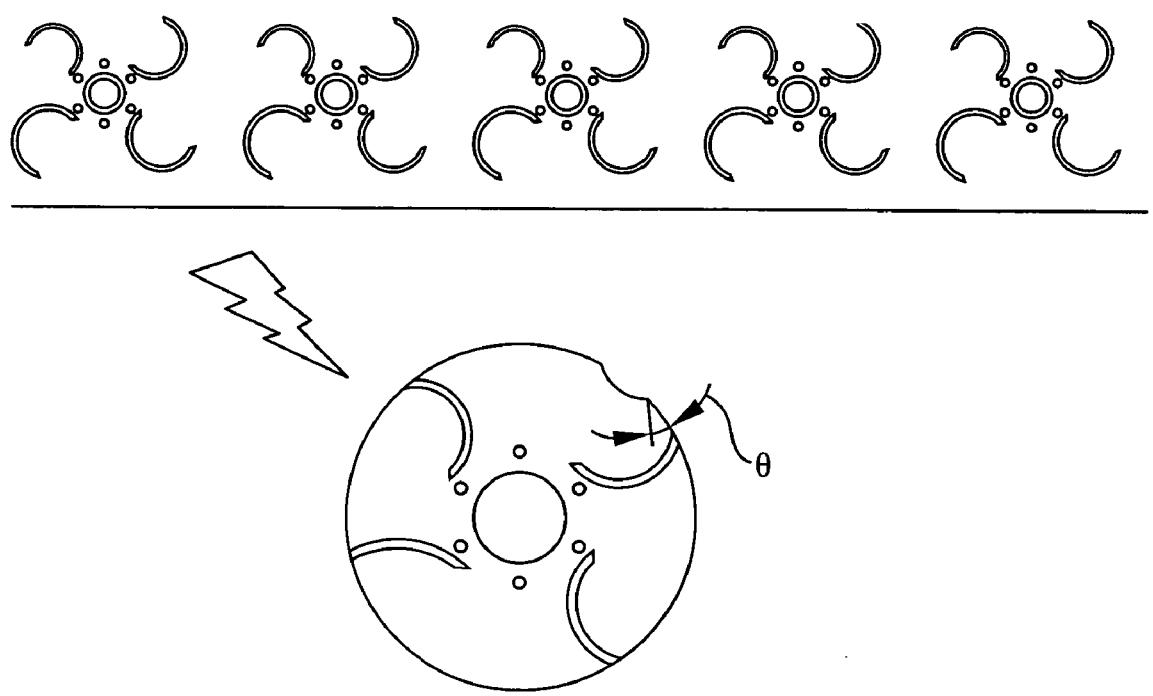
FIG. 8 illustrates an exemplary strip of flange performs and a resultant flange, after it has been trimmed to size.

The fiber grooves 120A, 120B, 120C, 120D are characterized by their respective radii $R_A$, $R_B$, $R_C$, $R_D$, wherein $R_A<R_B<R_C<R_D$. The smaller radii correspond to the smaller diameter flanges and the larger radii correspond to the larger diameter flanges. For example, the fiber groove 120A corresponds to the flanges with the diameter $D_F$, where $D_F'<D_F<D_F''$. This is shown, for example, in FIG. 7, which illustrates that groove 120A may be used for all form factors that have diameters between two circles shown by dashed circles. The spacing between the dashed circles depends on the required clearance between the end of the wind fiber and the flange perimeter, so as to allow adequate space for splices and pigtails. A typical distance between perimeter of the wound fiber and the perimeter of the flange is 3 to 5 mm (assuming maximum amount of wound fiber). In this embodiment the groove exits tangent to the average diameter of the dashed circles. More specifically, groove 120A characterized by a radius of curvature Ra=25 mm corresponding to 195 mm<$D_F$<200 mm. An exemplary strip of flange preforms and a resultant flange trimmed to a desired diameter are illustrated in FIG. 8.

Preferably, fiber grooves are placed on the internal side of the flange—i.e., the side facing the hub. This placement of fiber grooves is illustrated in FIG. 3 and eliminates the need for an external cover plate. In addition to the fiber grooves, one of the flanges, for example 114B, may include a notch 115 for identifying the desired groove. This notch can be easily provided during the trimming process. In addition, this notch 115 helps in retaining one end of the fiber during the winding process. More specifically, if the fiber groove does not reach the periphery of the flange, the notch 115 on the flange periphery brings the groove to the edge of the flange.

Figure 9:
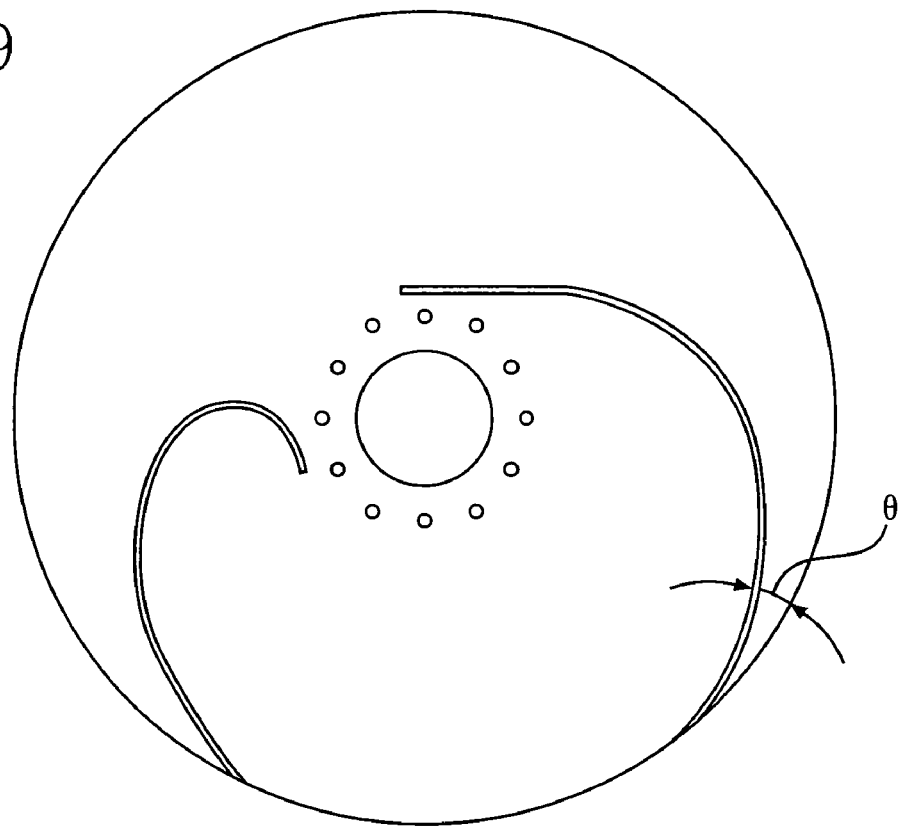
FIG. 9 illustrates another first embodiment of a flange.
Figure 10:
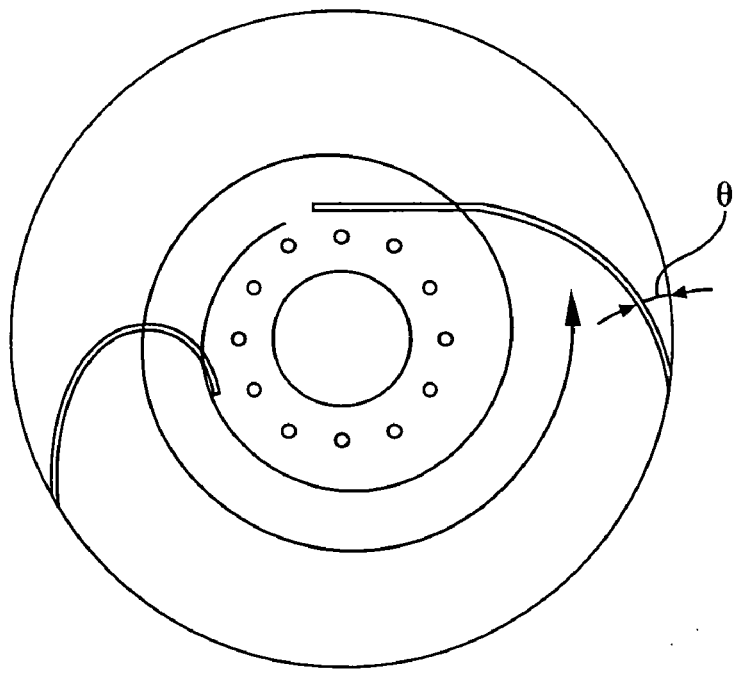
FIG. 10 illustrates a fiber groove that allows the fiber to exit in a direction opposite from the entering direction.

Another embodiment of the flange 114 is illustrated in FIGS. 9 and 10. This flange includes 2 grooves. Groove A is a reversing groove. It allows the fiber leads exit in the same direction. The fiber exits at shallow angles and the same groove accommodates flanges of different diameters. FIG. 10 illustrates a smaller diameter flange that was trimmed (to a smaller diameter) from an identical preform that trimmed to provide the flange of FIG. 9. Groove B allows the fiber to exit in a direction opposite from the entering direction (i.e., the fiber leads point to different directions). This is illustrated in FIG. 10. The advantage is that this flange design can be used to provide a wide range of flange diameters. For example, it has been utilized to provide flanges with outer diameters between 190 mm and 300 mm. An ability to derive flanges of any outer diameter from one flange preform advantageously reduces manufacturing costs and results in shortened lead-time.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A spool comprising: a hub sandwiched between two flanges at least one of said flanges including at least one smoothly curving arcuate fiber groove on a side facing said hub, said fiber groove extending substantially to the outer edge of said flange, said groove being at an angle $\theta$ relative to the tangent line to the periphery of said flange, said groove being capable of reversing the direction of fiber wherein said angle $\theta$ is less than 15 degrees.

2. The spool according to claim 1, wherein said angle $\theta$ is less than 5 degrees.

3. The spool according to claim 1, wherein said angle $\theta$ is less than 3 degrees.

4. The spool according to claim 1, wherein said flange has a plurality of fiber grooves, each of said fiber grooves being characterized by a different bend radius Ri.

5. The spool according to claim 1, wherein said fiber grooves are semicircular and are characterized by different radii of curvature.

6. A fiber spool comprising: a hub sandwiched between two flanges at least one of said flanges including at least one smoothly curving arcuate fiber groove on a side facing said hub, said fiber groove extending substantially to the outer edge of said flange, said groove being at an angle θ relative to the tangent line to the periphery of said flange, said fiber spool further containing fiber, wherein said fiber groove reverses fiber direction, so that fiber leads point in the same direction.

7. A spool comprising: a hub sandwiched between two flanges at least one of said flanges including at least one smoothly curving arcuate fiber groove on a side facing said hub, said fiber groove extending substantially to the outer edge of said flange, said groove being at an angle θ relative to the tangent line to the periphery of said flange, said groove being capable of reversing the direction of fiber wherein said flange includes at least two fiber grooves, one of said fiber grooves allows the exiting fiber to reverse direction, so that fiber leads point in the same direction, and another one of said fiber grooves allowing the fiber leads to point in opposing directions.

8. A method for making a spool comprising the steps of:
  (i) providing at least two trimable flange performs, each containing a plurality of fiber grooves, each of said fiber grooves being characterized by a different bend radius $R_i$;
  (ii) trimming said preforms to a desired size, thereby producing a flanges of desired diameter, while cutting at least one groove and maintaining at least one groove of said plurality of fiber grooves extending substantially to the outer edge of said flange, said groove being at an angle θ relative to the tangent line to the periphery of said flange so that said groove maintains desired bend radius of an optical fiber;
  (iii) providing a hub;
  (iv) assembling the hub and the flanges into the spool.

9. A method according to claim 8, further including the step of winding fiber around said hub.

10. A flange preform suitable for making flanges of various sizes, said flange including at least one fiber groove and trimable material, so that when said trimable material is cut off to form a flange of a specified outer diameter, said fiber groove extends substantially to the outer edge of said flange, said groove being at an angle θ relative to the tangent line to the periphery of said flange, said groove being capable of reversing the direction of fiber, wherein said angle θ is less than 5 degrees.

* * * * *